United States Patent
Mishra et al.

(10) Patent No.: US 11,838,929 B2
(45) Date of Patent: *Dec. 5, 2023

(54) ELASTIC LOCAL AND GLOBAL SCHEDULING FOR CELLULAR INFRASTRUCTURE

(71) Applicant: Parallel Wireless, Inc., Nashua, NH (US)

(72) Inventors: Rajesh Kumar Mishra, Westford, MA (US); Steven Paul Papa, Windham, MA (US); Kaitki Agarwal, Westford, NH (US); Sridhar Donepudi, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,328

(22) Filed: Sep. 14, 2021

(65) Prior Publication Data

US 2021/0410136 A1    Dec. 30, 2021

Related U.S. Application Data

(63) Continuation of application No. 15/339,916, filed on Oct. 31, 2016, now Pat. No. 11,122,559.

(Continued)

(51) Int. Cl.
*H04W 28/26* (2009.01)
*H04W 72/29* (2023.01)
(Continued)

(52) U.S. Cl.
CPC .......... *H04W 72/29* (2023.01); *H04W 24/10* (2013.01); *H04W 28/16* (2013.01); *H04W 28/26* (2013.01); *H04W 36/00835* (2018.08); *H04W 36/00837* (2018.08); *H04W 36/08* (2013.01); *H04W 72/044* (2013.01); *H04W 72/51* (2023.01); *H04W 72/542* (2023.01); *H04W 72/56* (2023.01); *H04W 84/18* (2013.01)

(58) Field of Classification Search
CPC . H04W 72/0433; H04W 24/10; H04W 28/16; H04W 28/26; H04W 36/00835; H04W 36/00837; H04W 36/08; H04W 72/044; H04W 72/048; H04W 72/085; H04W 72/10; H04W 84/18; H04W 36/0083
See application file for complete search history.

(56) References Cited

U.S. PATENT DOCUMENTS 11,122,559 B2 *  9/2021  Mishra ................. H04W 28/16
11,432,314 B2 *  8/2022  Mishra ............. H04W 72/0453
(Continued)

*Primary Examiner* — Donald L Mills
(74) *Attorney, Agent, or Firm* — Michael Y. Saji

(57) ABSTRACT

A method for scheduling resources in a network where the scheduling activity is split across two nodes in the network is disclosed, comprising: receiving, from a local scheduler in a first radio access network, access network information at a global scheduler; accessing information regarding a second radio access network allocating, at the global scheduler, resources for secondary allocation by the local scheduler; applying a hash function to map the allocated resources for secondary allocation to a set of hash values; and sending, from the global scheduler, the set of hash values to the local scheduler.

20 Claims, 8 Drawing Sheets

Related U.S. Application Data

(60) Provisional application No. 62/249,210, filed on Oct. 31, 2015.

(51) Int. Cl.
*H04W 28/16* (2009.01)
*H04W 36/00* (2009.01)
*H04W 24/10* (2009.01)
*H04W 36/08* (2009.01)
*H04W 72/044* (2023.01)
*H04W 72/51* (2023.01)
*H04W 72/56* (2023.01)
*H04W 72/542* (2023.01)
*H04W 84/18* (2009.01)

(56) References Cited

U.S. PATENT DOCUMENTS

| | | | |
|---|---|---|---|
| 2008/0095102 A1* | 4/2008 | Meng | H04W 74/08 370/329 |
| 2014/0213269 A1* | 7/2014 | Nama | H04W 28/16 455/451 |
| 2015/0098385 A1* | 4/2015 | Navalekar | H04W 64/003 370/312 |
| 2016/0029403 A1* | 1/2016 | Roy | H04W 72/0406 370/336 |
| 2017/0005706 A1* | 1/2017 | Khoshnevisan | H04L 1/0026 |
| 2020/0304179 A1* | 9/2020 | Ferrante | H04B 7/0408 |

* cited by examiner

ELASTIC LOCAL AND GLOBAL SCHEDULING FOR CELLULAR INFRASTRUCTURE

CROSS-REFERENCE TO RELATED APPLICATIONS

This application is a continuation of U.S. application Ser. No. 15/339,916, filed Oct. 31, 2016, which claims the benefit of priority under 35 U.S.C. § 119(e) to U.S. Provisional Pat. App. No. 62/249,210, titled "Elastic Scheduling" and filed Oct. 31, 2015, each of which is hereby incorporated by reference in its entirety for all purposes. In addition, the present application hereby incorporates by reference each of the following patent applications: U.S. Provisional Pat. App. No. 62/278,319 (PWS-71808US00), U.S. Pat. No. 8,867,418 (PWS-71710US01), U.S. Pat. App. Pub. Nos. US20140086120 (PWS-71700US01), US20150045063 (PWS-71727US01), US20150257051 (PWS-71756US01), US20150094114 (PWS-71729US01), US20160135132 (PWS-71775US01), and US20160081082 (PWS-71778US01), and U.S. Pat. application Ser. No. 14/868,074 (PWS-71780US01) and Ser. No. 14/828,432 (PWS-71771US01), in their entirety for all purposes.

BACKGROUND

Recently, it has become possible to create ad-hoc mesh networks that provide access to a cellular network, such as a Long Term Evolution (LTE) core network. The mesh networks may use backhaul that is wired or, in some cases, wireless using Wi-Fi or the LTE protocol itself (LTE backhaul), as described in U.S. Pat. No. 8,867,418 and U.S. Pat. Pub. No. US20150045063, for example, which are hereby incorporated by reference in their entirety. The use of mesh and wireless backhaul enables deployment of base stations in locations where they would otherwise not be able to be deployed.

Such mesh nodes need coordination for scheduling, particularly for scheduling backhaul radio transmissions. For instance, it is possible that one mesh node may interfere with another neighboring node. Certain protocols have been devised for inter-cell interference coordination (ICIC) to mitigate this problem. One approach to mitigation is to schedule activity on different frequencies or timeslots than are being used at nearby nodes.

However, latency is a problem for providing sophisticated ICIC and scheduling capabilities in a wireless network. The LTE standard requires all activity to be scheduled by the base station to within 1 ms (1 ms is thus referred to as the transport time interval, or TTI). It is difficult to provide scheduling that incorporates information from a network management gateway within 1 ms because the latency on communication between the base station and any node in the core network tends to entail single-digit millisecond latency or more. Reducing latency is expensive, as it requires, for example, installation of expensive high-speed fiber-optic backhaul connections for each node.

A need therefore exists for a way to perform scheduling that is more flexible than existing methods.

SUMMARY

In one embodiment, a method may be disclosed, comprising: receiving, from a local scheduler in a first radio access network, access network information at a global scheduler; accessing information regarding a second radio access network allocating, at the global scheduler, resources for secondary allocation by the local scheduler; applying a hash function to map the allocated resources for secondary allocation to a set of hash values; and sending, from the global scheduler, the set of hash values to the local scheduler.

The local scheduler may be located at a Long Term Evolution (LTE) eNodeB and wherein the global scheduler may be located at a core network gateway. The local scheduler may be located at an ad-hoc multi-radio access technology (multi-RAT) base station, and wherein the global scheduler may be located at a radio access network (RAN) gateway node positioned between the ad-hoc multi-RAT base station and an operator core network, and wherein the first radio access network may be a cell. The hash function may be one of modulus, cyclic redundancy check, MD5, SHA1, or SHA-256. The set of hash values further may further comprise scheduling hints, access lists, exclusion lists, or handover predictions for the local scheduler.

The method may further comprise accessing information regarding a plurality of radio access networks coupled to one or more core networks. The access network information further may further comprise channel usage information, signal strength information, interference information, or neighbor status information. The access network information further may further comprise user equipment (UE) measurement reports for a UE attached to the first radio access network. The access network information further may further comprise automatic neighbor relation lists from base stations in the first radio access network.

The method may further comprise resolving contention between the local scheduler and a second local scheduler regarding resources to be secondarily allocated at either the local scheduler or the second local scheduler. The method may further comprise sending, from the global scheduler, a single hash value to multiple base stations to permit a user equipment (UE) to be handed over without changing a channel or frequency. The method may further comprise allocating a majority of the resources at the local scheduler for secondary allocation by the local scheduler, and holding back resources at the local scheduler for priority users, and holding back additional resources at the local scheduler for cell edge users. The method may further comprise sending, from the global scheduler, a new set of hash values to provide scheduling hints and to invalidate the prior-transmitted set of hash values. The method may further comprise periodically updating the allocated resources and repeatedly sending the set of hash values at intervals.

The method may further comprise receiving, from the local scheduler, requests for resources; allocating, at the global scheduler, the requested resources; and sending, from the global scheduler, a set of hash values reflecting the requested resources to the local scheduler. The method may further comprise receiving, from the local scheduler, requests for resources; and coordinating, at the global scheduler, resource requests from a second local scheduler to prevent the second local scheduler from using the resources requested by the local scheduler.

In another embodiment, a system for allocating resources within a network is disclosed, comprising: a coordinating gateway coupled to a base station and providing connectivity for the base station as a gateway to an operator core network, the base station providing access to a user equipment (UE), the coordinating gateway further comprising: a scheduling module for allocating resources to the base station; a hash function module for applying a hash function to map the allocated resources for secondary allocation by the base station to a set of hash values; and a coordination module to receive resource allocation requests from a plurality of base stations and to coordinate the received allocation requests.

The system may further comprise the base station. The base station may further comprise a Long Term Evolution (LTE) eNodeB for providing access to a user equipment (UE) in an LTE radio access network (RAN), the base station further comprising a local scheduler for secondarily allocating resources according to instructions from the coordinating gateway, and a communications module for forwarding UE measurement reports and base station automatic neighbor relations (ANR) information to the coordinating gateway. The base station may further comprise multi-radio access technology (multi-RAT) functionality, the multi-RAT functionality comprising 3G and Wi-Fi functionality. The base station may further comprise an ad-hoc cellular base station.

DETAILED DESCRIPTION

Figure 1:
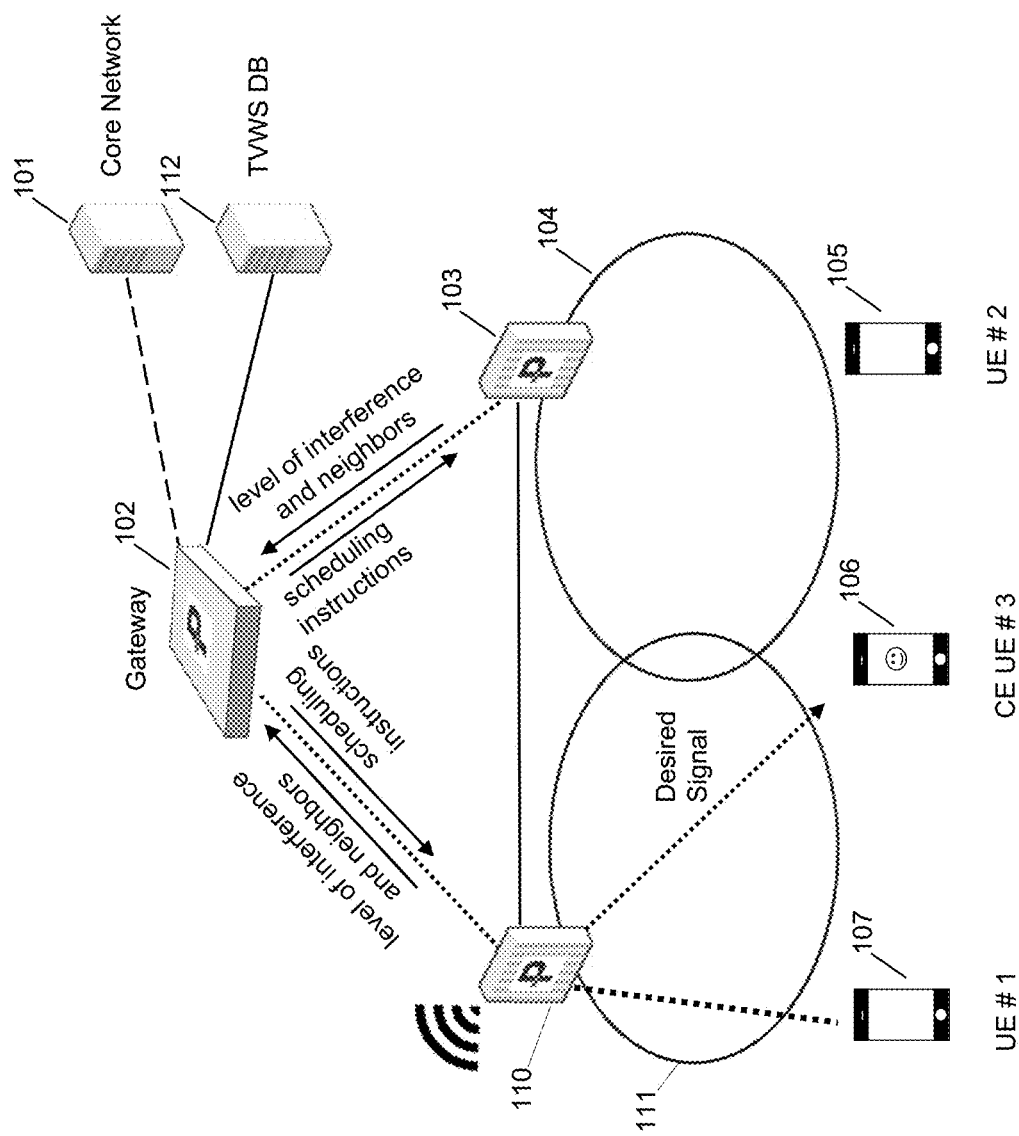
FIG. 1 is a schematic drawing of performing interference coordination at a centralized gateway in a wireless network, in accordance with some embodiments.

Ad hoc networks, mesh networks and multi-hop networks pose problems for centralized scheduling and access control methods. In general, the medium access control protocols in ad hoc networks have to combat two problems, namely, the "hidden terminal problem" or "hidden node problem," in which a node is visible to an access point but not to other nodes communicating with that access point, and the "exposed terminal problem," in which one node is prevented from transmitting because it erroneously concludes by carrier sense that its transmission would be detected as an interferer by an exposed terminal node.

On the other hand, deterministic access schemes set up timetables for individual nodes or links, such that the transmissions from the nodes or over the links are conflict-free in the code, time, frequency or space divisions of the channel. The schedules for conflict-free channel access can be established based on the topology of the network, or it can be topology independent. Deterministic access in real-world LTE systems require tight latency requirements. The method described herein allows relaxation of those requirements.

A solution proposed in this application is to coordinate scheduling among base station nodes in conjunction with a central coordinating node. The method described herein may be used for ad hoc networks, and also for regular centralized networks. Some scheduling activity may be performed at the coordinating node, as a global scheduler with a high-level, top-down view of the entire network, while low-latency scheduling activity may be performed by the base station nodes themselves as a local scheduler. Coordinating which node will handle which aspect of scheduling activity is performed by an access control method that incorporates node-activated multiple access (NAMA) technologies. Each node may use a hash function to distribute scheduling tasks among the multiple nodes. As scheduling is split between the local and global schedulers, and as the scheduling load may be moved backward and forward at any time, the scheduling is referred to as elastic.

In modern cellular network scheduling, the RAN typically performs all scheduling. For example, in LTE, the eNodeB is solely responsible for scheduling the use of resource blocks. The eNodeB has information about each mobile device, or user equipment (UE), that it is serving by receiving periodic measurement reports as specified in the LTe standard. Latency considerations make it difficult to move the scheduler off of the eNodeB or RAN. LTE performs scheduling every 1 ms, so scheduling at another network node is difficult without dedicated high-speed backhaul.

However, this may result in locally optimized scheduling that is not well-optimized when looking at multiple base stations together. Two base stations may interfere, or a handover may result in a UE being moved disruptively from one frequency to another. A technique is described herein that is akin to techniques used in mesh and ad-hoc networks, which use coordination between nodes for scheduling.

In some embodiments, the local scheduler may receive hints or instructions from a coordinating node, such as a core network node. Scheduling is still performed at the base station; however, with the addition of hinting information from the coordinating node it is possible to produce schedules that are more suitable for the network as a whole. A scheduler that operates on this principle is described herein, including two components: a global scheduler (potentially at a network node in the core network) and a local scheduler (at the RAN or eNB).

Information in the network may flow to the global scheduler via the base station. A UE remains the source of real-time information regarding interferers at the location of the UE. UE measurement reports may also send information about other base stations that are able to be seen, which provides information to the global scheduler about which base stations are reachable from which locations. The UE also provides information about signal strength. This is helpful in allowing the global scheduler to understand whether a UE is at the cell center or at the cell edge. The UE may also provide information regarding its data and mobility needs, for example, regarding future handover or requested data rate, and this may be taken into account by the global scheduler. In some embodiments, the coordinating server hosting the global scheduler may be a gateway between the RAN and the core network, and may be in the data path for control plane messages, such as handover messages, and these messages may also be integrated.

Once information regarding, e.g., cell edge/cell center, interferers, usage, and mobility is received at the global scheduler from UEs as measurement reports via the base station, the global scheduler may perform allocation of resources. Allocation may be performed on a global basis, across multiple base stations, thereby providing the advantages of coordination described herein. Allocation may be based on any of the preceding factors, UE priority, service type priority, public safety priority, or other factors. Allocation may be based on predictions of any of the above, derived from statistical analysis or heuristics. Prediction may be based on "big data," e.g., any and all data that has been collected and retained over a period of time to facilitate discovery of statistical connections in the data, such as are described by U.S. Pat. App. Pub. No. 20160135132 (PWS-71775US01), hereby incorporated herein in its entirety for all purposes. Allocation may be based on load or resource usage, availability of resources in another radio access technology (e.g., UEs may be scheduled based on their ability to be handed over from 4G to 3G).

In an exemplary allocation, 80% of the available resources may be allocated to the eNodeB to allocate at its local scheduler at its discretion. 10% of the resources may be reserved for cell edge usage, and 10% may be reserved for priority usage. In some embodiments, different percentages may be used. Once a resource is allocated, it is mapped to a hash value (or hash key), which the global scheduler may send to the base station local schedulers. Granting limited autonomy to the local scheduler provides the efficiencies of parallel processing while also eliminating the very tight latency requirement of total scheduling offload to a remote server. The methods described herein permit control of the bounds for this limited autonomy.

In some embodiments, allocated resources may be turned into a value using an arbitrary hash function that serves to provide a unique or semi-unique value. Collisions between hash values are not considered, in these embodiments, and therefore are intended to be rare and are to be avoided. Via a set of different hash construction methods, such as constructing hash values based on a node's IP address which is unique within the RAN, or such as via the schemes described below at para. [0043], we can avoid collisions. Prepending a base station identifier also helps to reduce the likelihood of hash collisions. The hash values may simply be used as a flexible way to denote particular resources, and the resources assigned may be broad. By use of a hash function, a level of indirection is added that allows for the semantics of the interaction to be changed and for the system to be reconfigurable to interoperate with different radio access technologies, environments, etc. The hash function may be any mapping, but may particularly be a fast message digest generator that returns a random integer in a predetermined range, as described by Bao et al., in some embodiments, or one of the hash functions typically used for creating a checksum, in some embodiments, or a hash table, in other embodiments, or a cryptographic hash table, in some embodiments. Specific examples include simple modulus, CRC32 checksum, Adler32, Haval, MD2, MD4, MD5, SHA1, SHA-224, SHA-256, SHA-384, SHA-512, RIPEMD128, RIPEMD160, RIPEMD320, Tiger, Whirlpool and GOST3411.

In some embodiments this allocation may be represented as follows. All resources available to be allocated may be mapped to a hash space. At the simplest conceptual level, one hash value (hash key) may represent a single resource block out of all the resource blocks (RBs) available to every eNodeB in the network. This resource block can be assigned to a base station by sending the hash key to the base station. In other embodiments, the mapping of keys to RBs may be unequal, such that certain hash values represent a larger number of resource blocks, helpful in the scenario described above in which 80% of resources are intended to be scheduled by the local scheduler. For example, one 20 MHz band in LTE constitutes 100 RBs, which may be used to generate 100 hash values, with 80 of those hash values being sent to the eNodeB for independent local allocation. Another example of an unequal mapping is a hierarchical hash mapping, in which one hash value is mapped to a plurality of other hash values, defining a hierarchy of greater- and lower-valued hash values.

In other embodiments, the hash function may be designed in such a way that a particular resource block is mapped to the same hash value. Two requests to use the same resource may result in a hash collision, as in a hash table. This may provide efficiency gains in some embodiments for determining which of a large set of resource requests conflict with other resource requests.

Resources may be resource blocks in LTE, in accordance with some embodiments. However, the term as used herein is meant to be interpreted broadly. For example, resources may include frequencies, timeslots, symbols, channels, carriers, or other transmission slots, or all of the above, managed as a superset at the global scheduler. Resources in orthogonal frequency division multiplexing (OFDM), Long Term Evolution (LTE), 3G (3GPP and non-3GPP), 2G, code division multiple access (CDMA), time division multiple access (TDMA), frequency division multiple access (FDMA), and other standards are intended to be included. In some embodiments, resources may not be scheduled, e.g., such as in Wi-Fi. However, in some embodiments, a Wi-Fi access point may be equipped with a local scheduler and may be configured to use the global scheduler described herein, and the resources may be timeslots on Wi-Fi channels, and the system described herein may be used in place of, or in conjunction with, the carrier sense multiple access (CSMA) contention resolution method that is part of the Wi-Fi standards.

In some embodiments, other resources may be represented using the hash function, i.e., within the hash space. Single resource blocks, sets (blocks) of resource blocks, other-radio access technology (other-RAT) resources, percentages of resource blocks, percentages of processor load, network bandwidth, etc. may be assigned using special hash values. Other, non-resource information, such as access lists, exclusion lists, handover predictions, and other scheduling hints may also be turned into hash values and sent from the global scheduler. Special hashes could be used to designate high-priority UEs, or UEs that are about to be handed over, with the global scheduler having access to analytics that make it possible to predict handover, or handover request messages, or both. Mesh backhaul traffic may be assigned priority using special hashes. This allows the global scheduler to exert control over aspects of the radio access network that are traditionally off limits to the core network. For example, the global scheduler could provide different hints at different times of day, and could allocate or reserve a larger or smaller portion of the available resource blocks using these hints and instructions conveyed using the hash function.

The global scheduler may, when assigning resources, evaluate resource allocation based on the whole network, or based on resources at all base stations which are specifically known to be visible based on UE measurement reports from the UEs attached to each base station. The global scheduler may allow a particular base station to use more or fewer resources. Assigning fewer resources to an eNodeB may help mitigate CPU or network load, congestion, or other load factors, for example. Assigning more or fewer resources may also enable optimal use of a dense heterogeneous network (hetnet) deployment, in some embodiments, enabling a macro cell to not use up the most desirable frequency resources, and permitting small cells to schedule resources at the cell center that are excluded from use by the macro cell.

The global scheduler may break ties among base stations for contested resources, such as resources in contention across the set of visible base stations. Even though base station may have its own unique hash function space, the global scheduler may be aware of which resources conflict with other resources across base stations. The global scheduler may, in some embodiments, pool the resources for a base station and all of its neighbors, as determined based on received UE measurement reports, a priori configuration, prior-collected statistics, or another means. The global scheduler may look at each base station's one-hop neighbors, or two-hop neighbors, to create the hash list. This mechanism, drawn from the node activated multiple access (NAMA) paradigm, enables the global scheduler to consider only a subset of resources in the network at any given time.

The contested resource may be detected at the global scheduler, and the global scheduler may make a determination about which base station should receive the resource. Ties may be broken based on one of the methods described herein and in the references incorporated herein, or using such data as: by priority, by calculating and summing the negative effects on a set of UEs or base stations, randomly, or by another means. Once a hash value (or hash key) is assigned to a resource, the global scheduler may send it to the base station local schedulers.

Contests may occur, for example, when a resource is being used by a UE which is part of a cell edge. The UE may report the relative signal strength (for example, RSRP, RSSI, or another measurement) for each of its neighboring base stations, thereby making it possible for the global scheduler to identify the UE as being at the cell edge. Neighbor lists from automatic neighbor relation (ANR) reported by the base stations themselves and according to the LTE standard could also be used, as well as neighbor lists based on GPS coordinates, pre-configured relationships, etc. The global scheduler may then determine that its resources should be reserved for use by the serving cell and not be released for use by the interfering cell. The global scheduler may then assign to the interfering cell a set of hash keys that does not include the hash key for the resources being used by the UE at the cell edge.

Hash values and hash keys may be prepended or postpended with, or may have embedded within them, identifiers or information about the cell, such as a base station identifier, an operator identifier or another identifier, to be used for performing priority determinations, so that the local and global scheduler may, for example, always provide priority to a macro base station over a small cell base station, or to increase uniqueness. In some embodiments a base station identifier may be prepended to the hash value, so that each hash value is unique to a particular base station. This allows multiple base stations to reuse the same resources (such as resource blocks). The global scheduler may keep track of which resources are the subject of an exclusion across cell boundaries, i.e., complementary resources are required to be used because a particular resource is being used in another cell.

During operation, UEs may request, and base stations may provide, resources. Based on resources that are being consumed or about to be consumed, the base station may report usage and predictive usage information to the global scheduler, while simultaneously assigning local resources for immediate use, from a block of resources granted by the global scheduler for the local scheduler's exclusive control. This information may be used to identify resources for use at the global scheduler. In some embodiments, at any time when resources are identified for use at a particular base station, the global scheduler may determine which base stations are neighboring base stations, and assign complementary and non-overlapping resources at the neighboring base stations. The reservations (hash values) and exclusions (implemented by assigning other hash values to other eNodeBs for resources that are complementary to the reserved resources) generated at the global scheduler are then pushed to the relevant local schedulers with a small latency, for example, seconds or tens of seconds. The end result is that neighboring base stations may be assigned complementary resources and may not contend for the same resource.

In some embodiments, the global scheduler may attempt to keep a UE on the same frequency across handover. This simplifies things for the UE and prevents, for example, causing the UE to move to a frequency or radio resource with less-desirable propagation characteristics, thus resulting in a dropped call. The global scheduler may in such a case permit the UE to use the same resource across multiple base stations. This may be done by assigning the particular resource at one base station prior to handover, identifying the time at which the handover will occur, and assigning the resource to the target cell following handover. The global scheduler may use UE handover information from the UE or the base station to determine at what time the handover will occur. In some embodiments this may be performed by assigning the same hash twice, to both the source and the target eNodeB, or by otherwise sharing the same hash across eNodeBs. The global scheduler may, in some embodiments, permit the use of the same resource by two neighboring base stations in the case of handover, if by doing so the same resource is in use by the same UE. The UE may retain the same hash value across multiple base station handovers. The global scheduler may attempt to determine what hash value can be retained across handovers, and may attempt to determine this desirable hash value prior to handover.

In some embodiments, the global scheduler may assign resources based in part on a random seed value, such as the current time. By assigning resources randomly, the global scheduler may avoid a lack of dynamism in time slot/frequency slot distribution. This is important because not all frequencies are equally usable; some frequencies propagate well or poorly, and act differently in different environments; some resource blocks may be noisy because of localized interferers, etc. Instead, the global scheduler attempts to ensure that different base stations use different frequencies over time. The global scheduler may incorporate hints or learn information over time regarding what frequencies and time slots are more effective to use for which base stations.

In some embodiments, the global scheduler may change schedules assigned to individual base stations over time. Hash keys may be sent every 5, 10, or 15 seconds, in some embodiments. Hash calculation and distribution frequency may be dependent on X2 protocol link latency or any other link latency, traffic conditions on the backhaul network, load and congestion on the access network, or other factors. Hash keys may have a time value embedded in them, postpended, or prepended, such that the base station is aware of when the hash key will expire. In some embodiments, hash keys may be revoked or invalidated by the global scheduler. In some embodiments, revocability is enabled by retaining an issued time timestamp on the hash key or having the issued time embedded in the hash key itself, and causing some or all hash keys to be invalidated as soon as a new hash key for that resource is received at the base station. In some embodiments, hash keys may also or alternatively be given expiration semantics such as time-to-live. In some embodiments, hash keys may also or alternatively be expressly revocable using a special instruction that includes the hash key value itself, which is available at the global scheduler. This mechanism enables the global scheduler to provide up-to-date, near-real-time scheduling hints across the entire network without requiring all base stations to have single-digit latency with the global scheduler.

In some embodiments, the global scheduler may be in communication with a TV whitespace database. TV White Space (TVWS) refers to the unused TV channels between the active ones in the VHF and UHF spectrum. These are typically referred to as the "buffer" channels. In the past, these buffers were placed between active TV channels to protect broadcasting interference. It has since been researched and proven that this unused spectrum can be used to provide broadband Internet access while operating harmoniously with surrounding TV channels. In 2010, the FCC made this highly effective yet underutilized spectrum available for unlicensed public use. With the use of a database manager and a White Space radio, these channels can be used to access broadband Internet connectivity. While the United States and United Kingdom are the forerunners in developing this new technology, many other countries are following their lead, and TV White Space is on track for worldwide usage. Geolocation databases track which channels are available in each geographic region. There are currently four companies that operate white spaces databases: Telcordia, Spectrum Bridge, Key Bridge and Google. These databases enable querying whether a particular frequency is in use at a particular location, and return results in near-real-time.

In some embodiments, the global scheduler may query an existing TVWS database (TVWS DB) and may use the results when performing scheduling. For example, given a base station/RAN that is capable of using TVWS, the base station may be assigned a hash corresponding to a TVWS frequency that is available at the present time. The global scheduler may send a request to the TVWS DB to register the frequency as unavailable.

In some embodiments, a global scheduler as described herein may be adapted for use as a local or worldwide TVWS DB. The scheduler described herein has a number of advantages over the current TVWS DB system. Currently, the TVWS DB contains statically configured transmitting stations, infrequently updated, and stored only with a binary yes or no status that is not useful for sharing. The scheduler described herein can accommodate near-real-time assignment of unused spectrum; can handle overlapping spectrum demands, which is superior to the current system; and can dynamically change the mix of who gets which spectrum.

In some embodiments, a hash value may be calculated by the global scheduler for allocation of a particular frequency resource, and this hash value may be distributed to a base station for use. The hash value has the qualities described herein, such as revocability, reusability via namespacing, low double-digit millisecond latency, etc. The hash value may be intermingled with other frequency resources at the same time, enabling a suitably equipped base station to use a greater amount of bandwidth as needed. In some embodiments, the global scheduler may interface with Google, etc.'s TVWS DB to keep them up to date, to perform registrations and deregistrations, and otherwise maintain the integrity of those databases so that the global scheduler may be used alongside, not replacing, the existing databases. The following changes to transmitting stations are proposed for use with the global scheduler performing a TVWS DB function. Each transmitting station may receive a hash from the global scheduler with a spectrum assignment. When they receive a new hash, any prior hash is invalidated, as with various other embodiments described herein. Thus, frequency of update can be controlled by the global scheduler. The scheduler described herein may be used for any arbitrary spectrum registration and access management, not just TVWS spectrum.

While in most embodiments contention resolution is not needed, the following text is drawn largely from Bao and Garcia-Luna-Aceves, "Distributed Channel Access Scheduling for Ad Hoc Networks," hereby incorporated by reference, and describes some embodiments of the disclosure. Ambiguities should be resolved by referring thereto. NCR and NAMA are described below for resolving the question of who should be granted priority between two nodes. In some embodiments, these particular methods may be used to resolve priority and contention. In some embodiments, the global scheduler may use other information to break ties and resolve priority. As well, a method for applying a hash function is described below. The hash function described elsewhere herein may be, in some embodiments, similar or equivalent to the below hash functions.

The neighbor-aware contention resolution (NCR) solves a special election problem where an entity to locally decide its leadership among a known set of contenders in any given contention context. We assume that the knowledge of the contenders for each entity is acquired by some means. For example, in the ad hoc networks of our interest, the contenders of each node are the neighbors within two hops, which can be obtained by each node periodically broadcasting the identifiers of its one-hop neighbors. Furthermore, NCR requires that each contention context be identifiable, such as the time slot number in networks based on a time-division multiple access scheme.

We denote the set of contenders of an entity i as Mi, and the contention context as t. To decide the leadership of an entity without incurring communication overhead among the contenders, we assign each entity a priority that depends on the identifier of the entity and the current contention context. EQN. 1 provides a formula to derive the priority, denoted by i.prio, for entity i in contention context t.

$$i.\text{prio} = \text{Hash}(i \oplus t) \oplus i, \quad (1)$$

where the function Hash(•) is a fast message digest generator that returns a random integer in a predefined range, and the sign '⊕' is designated to carry out the concatenation operation on its two operands. Note that, although the Hash(•) function can generate the same number on different inputs, each priority number is unique because the priority is appended with identifier of the entity.

```
NCR(i, t) {
    /* Initialize. */
    for(k∈Mi ∪ {i})
        k.prio = Hash(k ⊕ t) ⊕k;
    /* Resolve leadership. */
    if (∀k ∈ Mi, i.prio > k.prio) i is the leader;
} /* End of NCR. */
```

The above code listing shows the NCR algorithm. NCR generates a permutation of the contending members, the order of which is decided by the priorities of all participants. Since the priority is a pseudo-random number generated from the contention context that changes from time to time, the permutation also becomes random such that each entity has certain probability to be elected in each contention context, which is inversely proportional to the contention level as shown in EQN. 2.

$$q_i = 1/(|M_i \cup \{i\}|) \qquad (2)$$

Conflicts are avoided because it is assumed that contenders have mutual knowledge and t is synchronized, and the order of contenders based on the priority numbers is consistent at every participant.

Dynamic Resource Allocation

The description of NCR provided so far evenly divides the shared resource among the contenders. In practice, the demands from different entities may vary, which requires allocating different portion of the shared resource. There are several approaches for allocating variable portions of the resource according to individual demands. In any approach, an entity, say i, needs to specify its demand by an integer value chosen from a given integer set, denoted by pi. Because the demands need to be propagated to the contenders before the contention resolution process, the integer set should be small and allow enough granularity to accommodate the demand variations while avoiding the excess control overhead caused by the demand fluctuations.

Suppose the integer set is $\{0, 1, \ldots, P\}$, the following three approaches provide resource allocation schemes, differing in the portion of the resource allocated on a given integer value. If the resource demand is 0, the entity has no access to the shared resource.

We can then apply the NCR algorithm to derive four channel access protocols in ad hoc networks with omni-directional antennas. The description below pertains to node activated multiple access (NAMA).

Modeling of Network and Contention

We assume that each node is assigned a unique identifier, and is mounted with an omni-directional radio transceiver that is capable of communicating using DSSS (direct sequence spread spectrum) on a pool of well-chosen spreading codes. The radio of each node only works in half-duplex mode, i.e., either transmit or receive data packet at a time, but not both.

In multihop wireless networks, signal collisions may be avoided if the received radio signals are spread over different codes or scattered onto different frequency bands. Because the same codes on certain different frequency bands can be equivalently considered to be on different codes, we only consider channel access based on a code division multiple access scheme.

Time is synchronized at each node, and nodes access the channel based on slotted time boundaries. Each time slot is long enough to transmit a complete data packet, and is numbered relative to a consensus starting point. Although global time synchronization is desirable, only limited-scope synchronization is necessary for scheduling conflict-free channel access in multihop ad hoc networks, as long as the consecutive transmissions in any part of the network do not overlap across time slot boundaries. Time synchronization has to depend on physical layer timing and labeling for accuracy, and is outside the scope of this chapter.

The topology of a packet radio network is represented by a graph $G=(V,E)$, where V is the set of network nodes, and E is the set of links between nodes. The existence of a link $(u, v) \in E$ implies that $(v, u) \in E$, and that node u and v are within the transmission range of each other, so that they can exchange packets via the wireless channel. In this case, node u and v are called one-hop neighbors to each other. The set of one-hop neighbors of a node i is denoted as Ni1. Two nodes are called two-hop neighbors to each other if they are not adjacent, but have at least one common one-hop neighbor. The neighbor information of node i refers to the union of the one-hop neighbors of node i itself and the one-hop neighbors of i's one-hop neighbors, which equals $$Ni1 \cup (Nj1) \cdot j \in Ni1$$

In multihop wireless networks, a single radio channel is spatially reused at different parts of the network. Hidden-terminal problem is the main cause of interference and collision in ad hoc networks, and involves nodes within at most two hops. To ensure conflict-free transmissions, it is sufficient for nodes within two hops to not transmit on the same time, code and frequency coordinates. Therefore, the topology information within two hops provides the contender information required by the NCR algorithm. When describing the operation of the channel access protocols, we assume that each node already knows its neighbor information within two hops. Bao and Garcia-Luna-Aceves described a neighbor protocol for acquiring this information in mobile ad hoc networks.

Node-Activation Multiple Access (NAMA)

The node-activation multiple access, hereafter referred to as NAMA, protocol requires that the transmission from a node is received by the one-hop neighbors of the node without collisions. That is, when a node is activated for channel access, the neighbors within two hops of the node should not transmit. Therefore, the contender set Mi of node i is the one-hop and two-hop neighbors of node i, which is $Ni1 \cup (j \in Ni1\ Nj1) - \{i\}$.

```
{
    /* Initialize. */
    Mi=Ni1 ∪ j∈Ni1Nj1 -{i}; for(k∈Mi ∪ {i}))
        k.prio = Hash(k ⊕ t) ⊕k;
    /* Resolve nodal state. */
    if(∀k∈Mi,i.prio>k.prio){
        i.state = Tx;
        i.out = Ni1;
        [ Transmit the earliest packet in i.Q (i.out) ];
    }
}
else {
    i.state = Rx;
    [ Listen to the channel ];
} /* End of NAMA. */
```

The above code block specifies NAMA. Because only node i is able to transmit within its two-hop neighborhood when node i is activated, data transmissions from node i can be successfully received by all of its one-hop neighbor. Therefore, NAMA is capable of collision-free broadcast, and does not necessarily require code-division channelization for data transmissions.

Table 1 which follows explains in further detail the symbols used herein.

TABLE 1

| | |
|---|---|
| i.prio | The priority of node i. |
| (u, v).prio | The priority of link (u, v). |
| i.code | The code assigned to node i for either reception or transmission. |
| i.state | The activation state of node i for either reception or transmission. |
| Tx | Transmission state. |
| Rx | Reception state. |
| i.in | The sender to node i. |
| i.out | The receiver set of node i. |

TABLE 1-continued

| | |
|---|---|
| i.Q(i.out) | The packet queues for the eligible receivers in i.out. |
| Nic | The set of one-hop neighbors assigned with code c at node i. |
| [ statement ] | A more complex and yet easy-to-implement operation than an atomic statement, such as a function call. |

A description of embodiments follows with reference to the figures.

FIG. 1 is a schematic drawing of performing interference coordination at a centralized gateway in a wireless network, in accordance with some embodiments. Gateway 102 is shown coupled to core network 101 and TV whitespace database 112. Gateway 102 is also placed between the core network 101 and the radio access network, specifically, base stations 103 and 110. Base station 103 has coverage area 104. Base station 110 has coverage area 111. Base station 110 also has a wireless backhaul link to the public Internet (not shown). UE #1, labeled 107, and UE #3, labeled 106, are attached to base station 110. UE 105 is attached to base station 103. Base stations 110 and 103 are in communication with gateway 102, sending interference and neighbor information, and receiving scheduling instructions from the gateway. UE 106 is being interfered with by transmissions to and from UE 107. UE 106 is also a priority UE.

In operation, base stations 110 and 103 perform two-stage scheduling with gateway 102 as follows. Both base stations 110 and 103 individually schedule their own coverage areas 111 and 104, respectively. However, they only schedule their UEs within a preauthorized portion, such as 80%, of the available spectrum resources, as made available by gateway 102 via prior scheduling hints. After interference is detected at UE 106 and forwarded as a measurement report via base station 110, gateway 102 determines that UE 106 requires greater priority, allocates resources out of a priority resource pool, and sends a new hash to base station 110 granting access to the new priority resource for UE 106. During this time, base station 110 has been performing scheduling as normal. Several milliseconds later, when base station 110 receives the updated resource hash, the resource hash is decoded, the base station assigns UE 106 the additional priority resource, and UE 106 experiences improved performance. UE 106 closes the loop with gateway 102 several milliseconds later by sending a UE measurement report to base station 110, which is forwarded to gateway 102.

Figure 2:
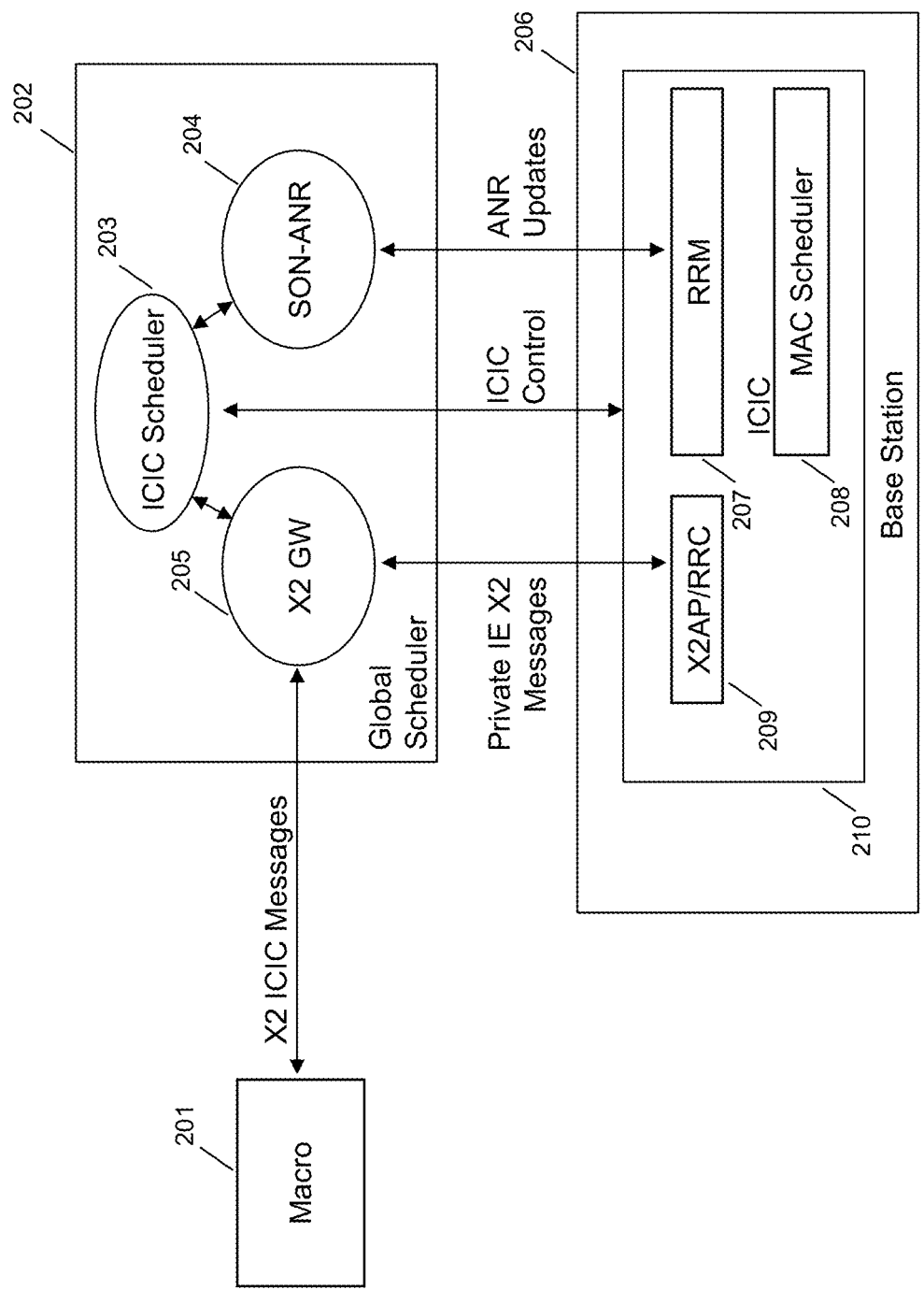
FIG. 2 is a block diagram of scheduling performed at a gateway and at a base station, in accordance with some embodiments.

FIG. 2 is a block diagram of scheduling performed at a gateway and at a base station, in accordance with some embodiments. Global scheduler 202 is located at a gateway. Base station 206 is in communication with gateway/global scheduler 202. Within gateway/global scheduler 202 are inter-cell interference cancellation scheduler 203, self-organizing network/automatic neighbor relations module 204, and X2 protocol gateway 205. Each of these modules work in concert to minimize interference among multiple cells and to communicate the mitigation instructions to the cells. The communication is shown as X2 messages with private information elements from the X2 gateway 205, as ICIC control instructions from ICIC scheduler 203, and ANR updates from SON/ANR module 204. Gateway 202 is also in communication with macro 201 via X2AP ICIC messages.

Within base station 206 is a radio access network control module 210, which incorporates an X2 application protocol/radio resource control module 209, a radio resource management module 207, and an ICIC-capable medium access control (MAC) scheduler 208. These modules act in concert to schedule traffic by each UE attached to the base station, and to communicate to gateway 202 or the operator core network (not shown). Scheduler 208, in particular, is responsible for performing the local scheduler activities described herein, including decoding resource allocations from ICIC scheduler 203.

Figure 3:
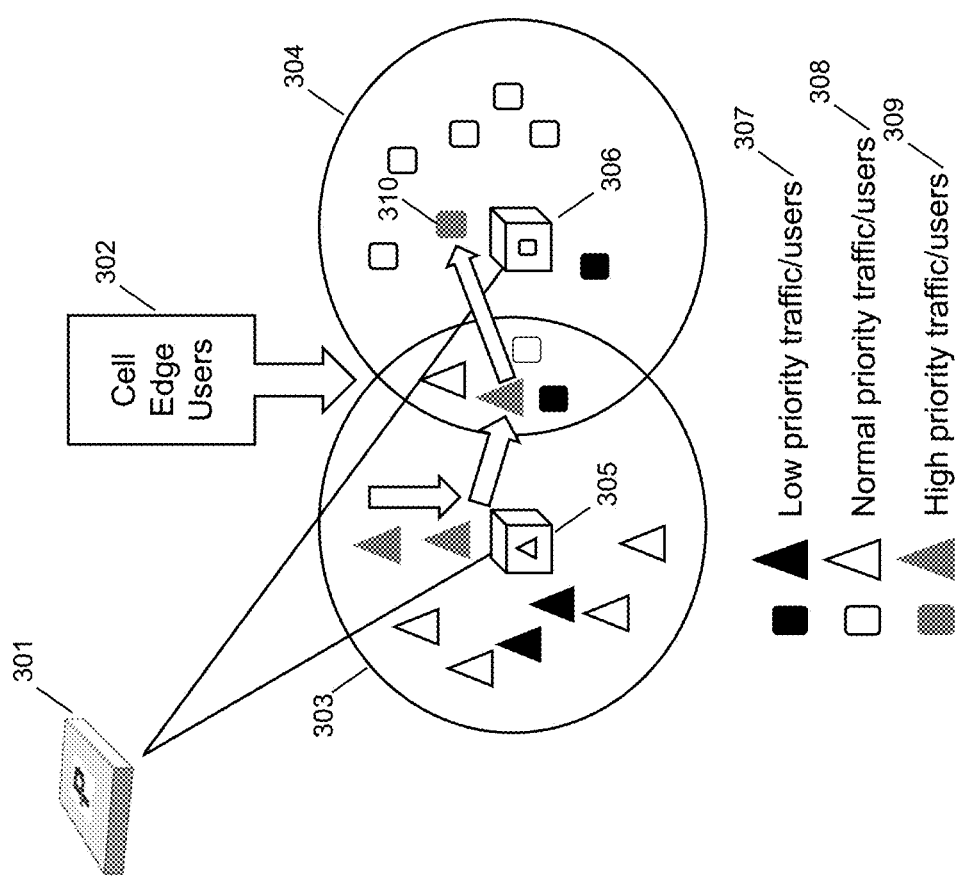
FIG. 3 is a schematic diagram showing access nodes in a wireless access network, in accordance with some embodiments.

FIG. 3 is a schematic diagram showing access nodes in a wireless access network, in accordance with some embodiments. Gateway 301 is a remote global scheduler. Base station 305 produces coverage area 303, and base station 306 produces coverage area 304. All the UEs attached to base station 305 are shown as triangles, and all of the UEs attached to base station 306 are shown as squares. Within each coverage area, certain UEs 307, shown as black, are low priority traffic or low priority users; certain UEs 308, shown as white, are normal priority traffic or normal priority users; and certain UEs 309, shown as gray, are high priority traffic or users.

Four users are shown in the overlapping area covered by both coverage area 303 and coverage area 304. These UEs are the cell edge users 302. Cell edge users have more interference to deal with, since they are covered by multiple base stations, and also have lower signal-to-noise ratios, since they are more distant from the transmitter. Based on UE measurement reports, gateway 301 is able to determine that these users are the cell edge users.

In operation, remote scheduling gateway 301 periodically generates and distributes scheduling hash keys to base stations 305 and 306, which give the base stations autonomy to calculate timeslots for different buckets, e.g., cell edge, traffic priority, user priority. As shown, UE 310 is being handed over from source base station 305 to target base station 306, shown by the trail of three gray triangles followed by one gray square. UE 310 is first a cell center user, then a cell edge user, then a cell center user in the new cell. UE 310 is also a high priority user. Gateway 310, based on measurement reports and handover messages, is able to determine that the user is being handed over. With the help of analytics, gateway 310 can proactively push the hash key to target base station 306 with anticipatory scheduling. A particular resource is reserved for this user at base station 305, and as it is handed over to base station 306, the hash for that resource is revoked at base station 305 and transferred to base station 306, enabling the user to be handed over without diminished performance. The same process may be used when steering the user to a different RAT.

Figure 4:
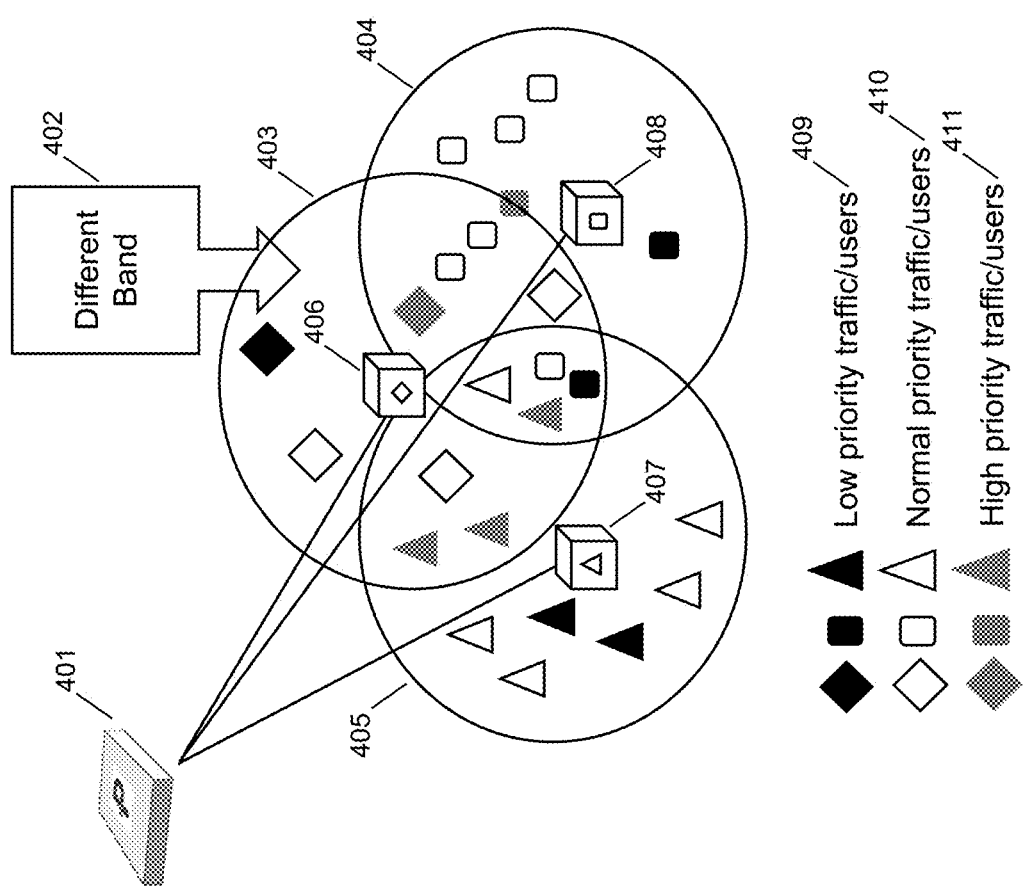
FIG. 4 is a further schematic diagram showing access nodes in a wireless access network, in accordance with some embodiments.

FIG. 4 is a further schematic diagram showing access nodes in a wireless access network, in accordance with some embodiments. Gateway 401 is a remote global scheduler. Base station 407 produces coverage area 405, base station 408 produces coverage area 404, and base station 405 produces coverage area 403. All the UEs attached to base station 407 are shown as triangles, and the UEs attached to base station 408 are shown as squares, and the UEs attached to base station 406 are shown as diamonds. Within each coverage area, certain UEs 409, shown as black, are low priority traffic or low priority users; certain UEs 410, shown as white, are normal priority traffic or normal priority users; and certain UEs 411, shown as gray, are high priority traffic or users. The coverage area of base station 406 uses a different band, shown with label 402. Base station 406 is not as heavily loaded, based on number of UEs, as base stations 407 and 408. Based on traffic, congestion, or other factors, gateway 401 may steer users from one band or RAT to another band, as shown here by base station 406.

Figure 5:
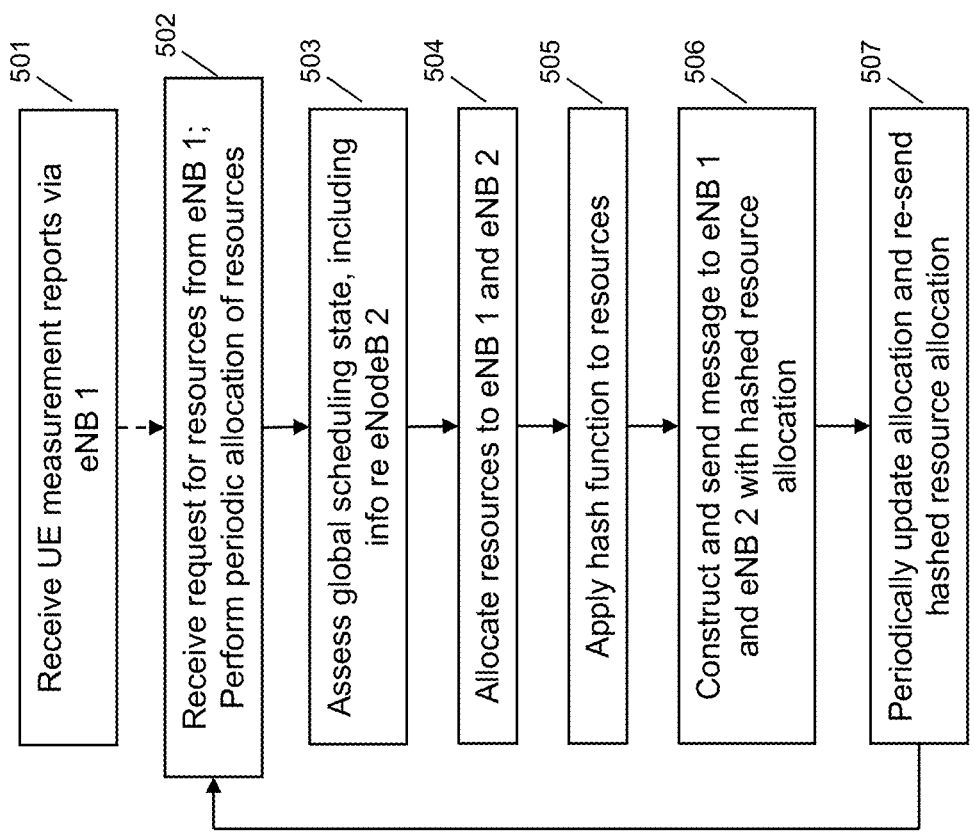
FIG. 5 is a flowchart of a scheduling coordination method, in accordance with some embodiments.

FIG. 5 is a flowchart of a scheduling coordination method, in accordance with some embodiments. At step 501, the global scheduler receives UE measurement reports via eNB 1. UE measurement reports and ANR information are continuously forwarded to the global scheduler by eNodeBs in the network. At step 502, the global scheduler receives a request for resources from eNB 1. This step may be performed periodically to allocate or reallocate resources in the network. If a request is being processed at a time when the base station has not received UE measurement reports or ANR data, other information may already be available, such as preconfigured information regarding locations and interference potential of base stations, or general policies regarding percentage of resources to be granted back to local schedulers to reallocate. If real-time or near-real time information is available, this information may be incorporated into the resource allocation decision.

At step 503, during processing of the received resource request from eNB 1, the global scheduler assesses global scheduling state, including information from other eNodeBs, global policies, information regarding load in various parts of the network, bandwidth constraints for backhaul, and so on. Interference caused by or to be caused to other nodes may be specifically considered. Previously-reserved resources in other neighboring cells and priority allocations in this cell and other cells are other examples of information that may be considered.

At step 504, resources are allocated to both eNB 1 and to eNB 2 (and other nodes in the network). Resource allocation may be performed, for example, as a depth-first search, in which each node is replaced with the set of the node plus its neighbors, in order to consider interference in other parts of the network. By expanding each node only to its neighbors, or in some cases to its neighbors' neighbors, the search space is limited in case the network is large, and distant or disjoint areas of the network are not forced to share resources unnecessarily.

At step 505, once resources have been allocated, a hash function is applied to each resource allocation to transform the resources into a series of hash values, as described herein. At step 506, once the hash functions have been performed, messages are constructed and sent to eNB 1 and eNB 2 with the hashed resource allocation. The allocations may not be in real time, e.g., within 1 ms; however, the system may be configured based on the latency of the system to provide guesses for network conditions in the future, for example, 30 ms in the future for a system with 30 ms roundtrip latency. At step 507, the allocations are periodically updated and re-sent to each base station.

Figure 6:
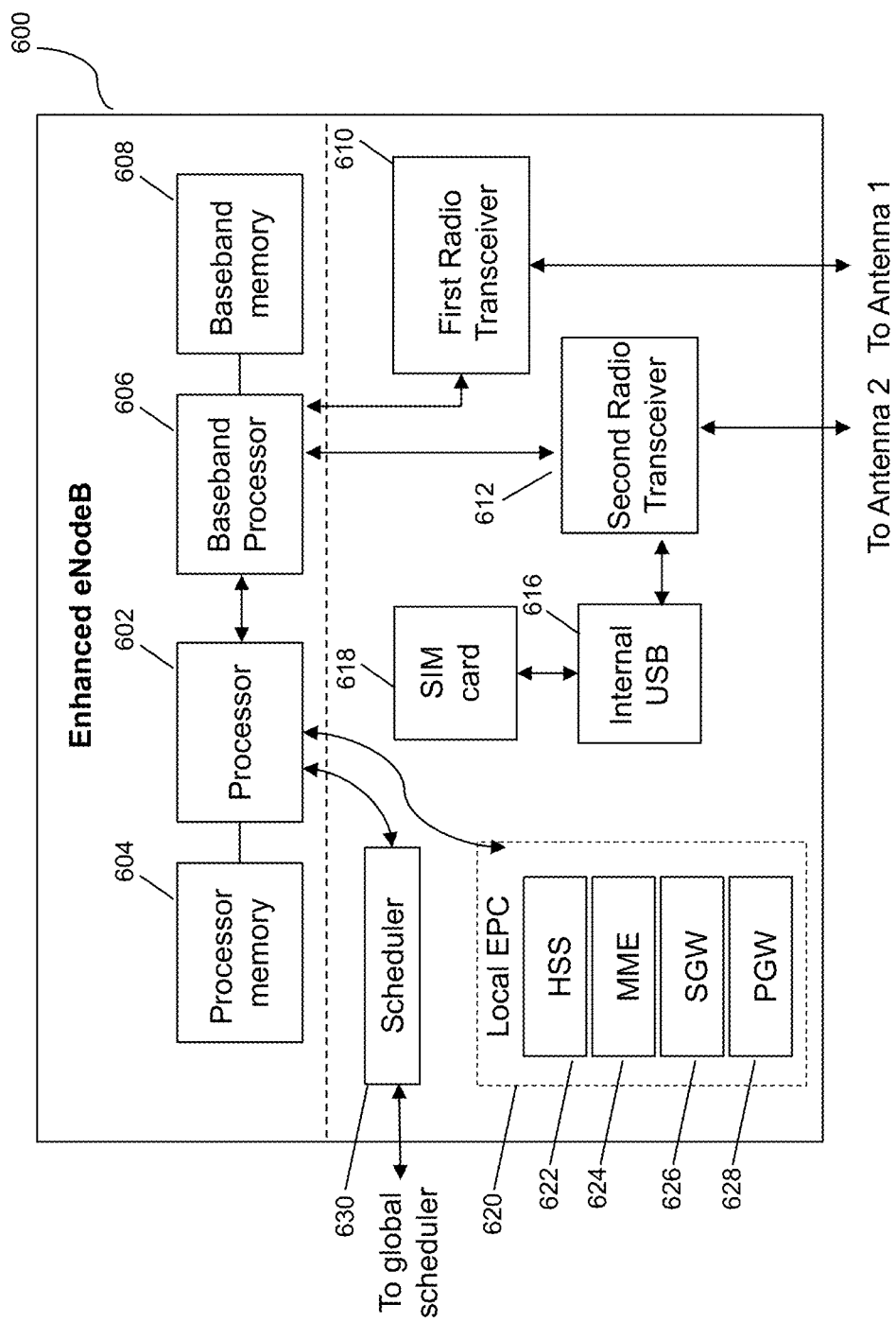
FIG. 6 is a schematic diagram of an enhanced eNodeB, in accordance with some embodiments.

FIG. 6 is a schematic diagram of an enhanced eNodeB, in accordance with some embodiments. Enhanced eNodeB 600 may include processor 602, processor memory 604 in communication with the processor, baseband processor 606, and baseband processor memory 608 in communication with the baseband processor. Enhanced eNodeB 600 may also include first radio transceiver 610 and second radio transceiver 612, internal universal serial bus (USB) port 616, and subscriber information module card (SIM card) 618 coupled to USB port 614. In some embodiments, the second radio transceiver 612 itself may be coupled to USB port 616, and communications from the baseband processor may be passed through USB port 616.

A scheduler 630 is shown, and may perform operations as described elsewhere herein. Specifically, scheduler 630 may receive communications from attached UEs, such as measurement reports, and ANR information from the eNB itself, and may forward them to a coordinating server (identified in FIG. 6 as "to global scheduler"). Scheduler 630 performs essential scheduling functions as required by the LTE standard, sending out scheduling information every 1 TTI for all UEs attached to eNodeB 600, but may incorporate hints or allocated resources via hash values received from the global scheduler at local scheduler 630. Local scheduler 630 may include a mapping to identify what resources have been allocated by reversing or otherwise interpreting the hashed hints and resource allocations received from the global scheduler.

The processor 602 may be in communication with a local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Scheduler 630 and local EPC 620 may each run on processor 602 or on another processor, or may be located within another device.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing LTE UE functionality. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an operator EPC is available, local EPC 620 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

Figure 7:
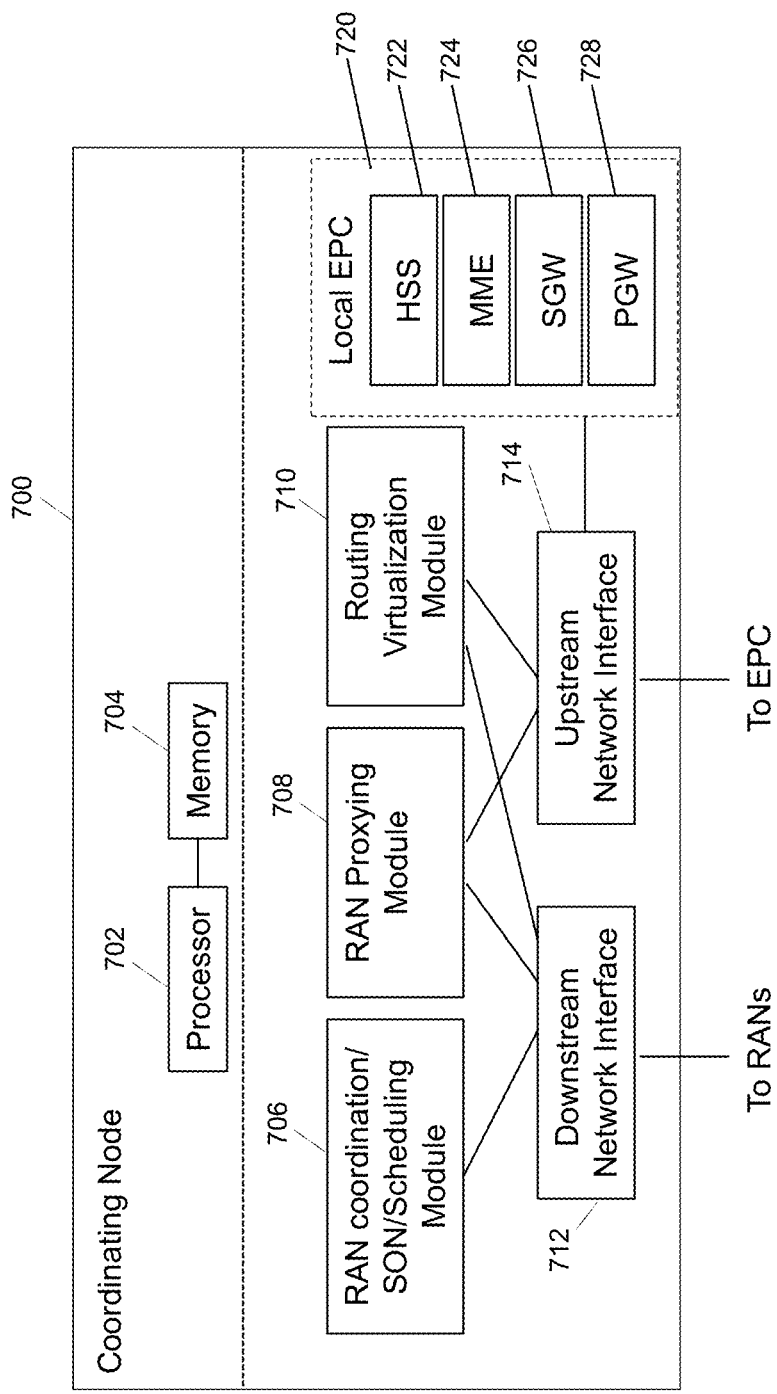
FIG. 7 is a schematic diagram of a coordinating node incorporating a global scheduler, in accordance with some embodiments.

FIG. 7 is a schematic diagram of a coordinating node, in accordance with some embodiments. Coordinating node 700 includes processor 702 and memory 704, which are configured to provide the functions described herein. Also present are radio access network coordination/SON/scheduling module 706, RAN proxying module 708, and routing virtualization module 710. RAN coordination/SON/scheduling module 706 may perform the functions described herein for global scheduling, including coordinating among requests from multiple base stations for resources, and assigning and sending hash keys to the base stations. In some embodiments, coordinating node 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet). Signaling storm reduction functions may be performed in module 706.

Coordinating node 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In some embodiments, the gateway of FIG. 7 may be a virtualized radio access network or may provide virtual network functions (VNFs). For example, the gateway of FIG. 7 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. The latency characteristics of the global scheduler described herein are flexible, as it is possible to provide helpful hints and hash keys for resources even with latencies of tens or hundreds of milliseconds. Therefore, the flexibility of a virtualized global scheduler is greater than that of a convention cloud radio access network (CRAN) infrastructure.

Figure 8:
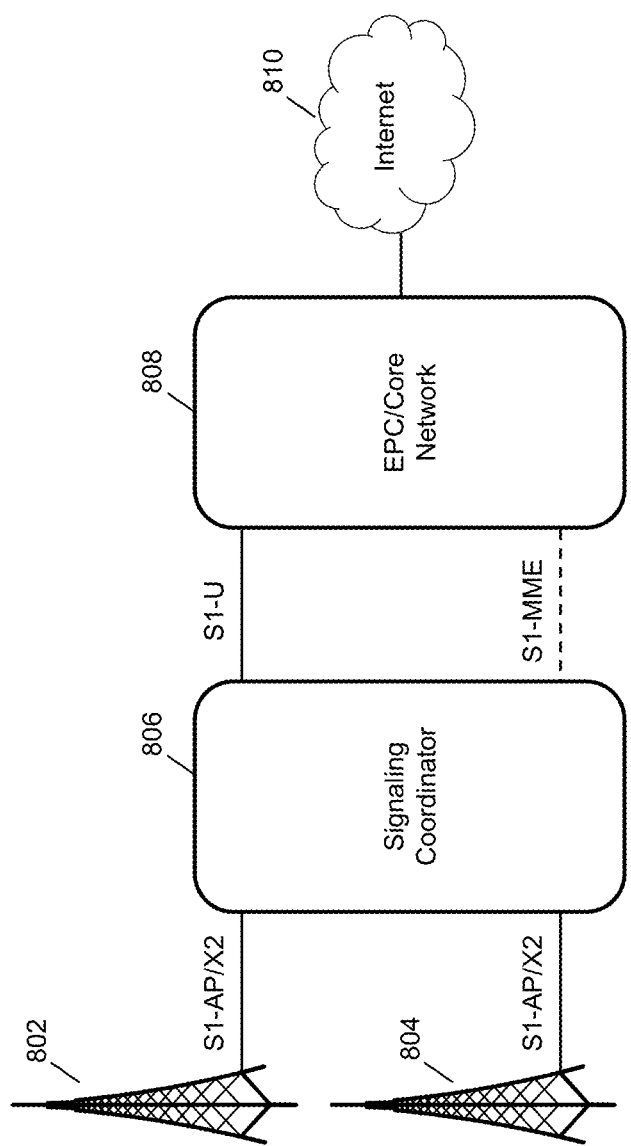
FIG. 8 is a system architecture diagram of an exemplary network configuration, in accordance with some embodiments.

FIG. 8 is a system architecture diagram of an exemplary network configuration, in accordance with some embodiments. Base stations 802 and 804 are connected via an S1-AP and an X2 interface to coordination server 806. Base stations 802 and 804 are eNodeBs, in some embodiments. Coordination server 806 is connected to the evolved packet core (EPC)/Core Network 808 via an S1 protocol connection and an S1-MME protocol connection. Coordination of base stations 802 and 804 may be performed at the coordination server. In some embodiments, the coordination server may be located within the EPC/Core Network 808. EPC/Core Network 808 provides various LTE core network functions, such as authentication, data routing, charging, and other functions. In some embodiments, mobility management is performed both by coordination server 806 and within the EPC/Core Network 808. EPC/Core Network 808 provides, typically through a PGW functionality, a connection to the public Internet 810. As shown in the figure, coordination server 806 is in both the data plane path and the control plane path between the base stations and the core network, and derives advantages from this position, including the ability to virtualize the base stations and control scheduling by communicating directly with the (non-virtualized) base stations.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, including FDD and TDD in different bands, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, or for a pair of small cells or pair of macro cells, the same techniques could be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although many of the examples described herein describe the use of this technique with an LTE network, the technique described herein may be used in a cellular network, an ad-hoc cellular network or other ad-hoc network, a Wi-Fi or microwave mesh network, or various other types of networks that require coordination and control, as would be understood by one of skill in the art. For example, Wi-Fi networks incorporating these techniques could also use carrier sense multiple access (CSMA).

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, an ordered sequence of multiple uplink cells may be selected by the coordinating node.

The invention claimed is:

1. A method, comprising:
receiving, from a local scheduler in a first radio access network, the first radio access network being a centralized network using an orthogonal frequency division multiple access (OFDMA) protocol, access network information at a global scheduler;
accessing information regarding a second radio access network;
allocating, at the global scheduler, radio resource blocks for secondary allocation by the local scheduler;
applying a hash function to map the allocated resources for secondary allocation to a set of hash values; and
sending, from the global scheduler, the set of hash values to the local scheduler.

2. The method of claim 1, wherein the local scheduler is located at a Long Term Evolution (LTE) eNodeB and wherein the global scheduler is located at a core network gateway.

3. The method of claim 1, wherein the local scheduler is located at an ad-hoc multi-radio access technology (multi-RAT) base station, and wherein the global scheduler is located at a radio access network (RAN) gateway node positioned between the ad-hoc multi-RAT base station and an operator core network, and wherein the first radio access network is a cell.

4. The method of claim 1, wherein the hash function is one of modulus, cyclic redundancy check, MD5, SHA1, or SHA-256.

5. The method of claim 1, wherein the set of hash values further comprises scheduling hints, access lists, exclusion lists, or handover predictions for the local scheduler.

6. The method of claim 1, further comprising accessing information regarding a plurality of radio access networks coupled to one or more core networks.

7. The method of claim 1, wherein the access network information further comprises channel usage information, signal strength information, interference information, or neighbor status information.

8. The method of claim 1, wherein the access network information further comprises user equipment (UE) measurement reports for a UE attached to the first radio access network.

9. The method of claim 1, wherein the access network information further comprises automatic neighbor relation lists from base stations in the first radio access network.

10. The method of claim 1, further comprising resolving contention between the local scheduler and a second local scheduler regarding resources to be secondarily allocated at either the local scheduler or the second local scheduler.

11. The method of claim 1, further comprising sending, from the global scheduler, a single hash value to multiple base stations to permit a user equipment (UE) to be handed over without changing a channel or frequency.

12. The method of claim 1, further comprising allocating a majority of the resources at the local scheduler for secondary allocation by the local scheduler, and holding back resources at the local scheduler for priority users, and holding back additional resources at the local scheduler for cell edge users.

13. The method of claim 1, further comprising sending, from the global scheduler, a new set of hash values to provide scheduling hints and to invalidate the prior-transmitted set of hash values.

14. The method of claim 1, further comprising periodically updating the allocated resources and repeatedly sending the set of hash values at intervals.

15. The method of claim 1, further comprising receiving, from the local scheduler, requests for resources; allocating, at the global scheduler, the requested resources; and sending, from the global scheduler, a set of hash values reflecting the requested resources to the local scheduler.

16. The method of claim 1, further comprising receiving, from the local scheduler, requests for resources; and coordinating, at the global scheduler, resource requests from a second local scheduler to prevent the second local scheduler from using the resources requested by the local scheduler.

17. A system for allocating resources within a network, comprising:
 a coordinating gateway coupled to a base station and providing connectivity for the base station as a gateway to an operator core network, the base station providing access to a user equipment (UE),
  the coordinating gateway further comprising:
   a scheduling module for allocating resources to the base station;
   a hash function module for applying a hash function to map the allocated resources for secondary allocation by the base station to a set of hash values; and
   a coordination module to receive resource allocation requests from a plurality of base stations and to coordinate the received allocation requests.

18. The system of claim 17, further comprising the base station, the base station further comprising a Long Term Evolution (LTE) eNodeB for providing access to a user equipment (UE) in an LTE radio access network (RAN), the base station further comprising a local scheduler for secondarily allocating resources according to instructions from the coordinating gateway, and a communications module for forwarding UE measurement reports and base station automatic neighbor relations (ANR) information to the coordinating gateway.

19. The system of claim 18, the base station further comprising multi-radio access technology (multi-RAT) functionality, the multi-RAT functionality comprising 3G and Wi-Fi functionality.

20. The system of claim 18, the base station further comprising an ad-hoc cellular base station.

* * * * *